US006996975B2

(12) United States Patent  (10) Patent No.: US 6,996,975 B2
Radhamohan et al.  (45) Date of Patent: Feb. 14, 2006

(54) MULTISTAGE REDUCTANT INJECTION STRATEGY FOR SLIPLESS, HIGH EFFICIENCY SELECTIVE CATALYTIC REDUCTION

(75) Inventors: Subbaraya Radhamohan, Novi, MI (US); Michael Eugene Crane, Gray, TN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/877,598

(22) Filed: Jun. 25, 2004

(65) Prior Publication Data

US 2005/0284134 A1  Dec. 29, 2005

(51) Int. Cl.
   *F01N 3/00* (2006.01)
(52) U.S. Cl. ............................. 60/286; 60/276; 60/301
(58) Field of Classification Search .................. 60/274, 60/276, 286, 295, 301
   See application file for complete search history.

(56) References Cited

U.S. PATENT DOCUMENTS

| 4,751,054 | A |   | 6/1988 | Watanabe |
| 5,833,932 | A |   | 11/1998 | Schmelz |
| 6,082,102 | A | * | 7/2000 | Wissler et al. ................ 60/286 |
| 6,125,629 | A |   | 10/2000 | Patchett |
| 6,173,568 | B1 | * | 1/2001 | Zurbig et al. .................. 60/286 |
| 6,182,444 | B1 | * | 2/2001 | Fulton et al. .................. 60/277 |
| 6,209,315 | B1 | * | 4/2001 | Weigl ........................... 60/274 |
| 6,269,633 | B1 | * | 8/2001 | van Nieuwstadt et al. .... 60/277 |
| 6,293,097 | B1 | * | 9/2001 | Wu et al. ...................... 60/286 |
| 6,334,986 | B1 |   | 1/2002 | Gieshoff et al. |
| 6,471,924 | B1 | * | 10/2002 | Feeley et al. ............. 423/213.5 |
| 6,694,724 | B1 | * | 2/2004 | Tanaka et al. ................ 60/274 |
| 6,761,025 | B1 | * | 7/2004 | Gladden ....................... 60/286 |
| 2004/0076565 | A1 |   | 4/2004 | Ghandi et al. |
| 2004/0098974 | A1 | * | 5/2004 | Nieuwstadt et al. .......... 60/286 |

* cited by examiner

*Primary Examiner*—Thomas Denion
*Assistant Examiner*—Diem Tran
(74) *Attorney, Agent, or Firm*—Paul V. Keller, LLC

(57) ABSTRACT

One aspect of the invention relates to an exhaust treatment apparatus having an $NO_x$ reduction system comprising first and second catalyst beds in series with associated first and second ammonia injectors. The first catalyst bed with its associated ammonia injector preferably targets removing only about 80 to about 95% percent of the $NO_x$ in the vehicle exhaust. The second catalyst bed with its associated injector preferably target removing about 70 to about 100% of the remaining $NO_x$. Staging the reduction system in this manner improves control over $NO_x$ reduction and reduces the risk of ammonia slip. Other aspects of the invention relate to methods of treating vehicle exhaust to remove $NO_x$ and an SCR reactor comprising a housing having an entrance port, an exit port, and an ammonia injection port, wherein the injection port is configured to inject ammonia in between SCR catalyst beds contained in the housing.

10 Claims, 1 Drawing Sheet

MULTISTAGE REDUCTANT INJECTION STRATEGY FOR SLIPLESS, HIGH EFFICIENCY SELECTIVE CATALYTIC REDUCTION

FIELD OF THE INVENTION

The present invention relates to the field of pollution control devices for internal combustion engines.

BACKGROUND OF THE INVENTION $NO_x$ emissions from vehicles with internal combustion engines are an environmental problem recognized worldwide. Several countries, including the United States, have long had regulations pending that will limit $NO_x$ emissions from vehicles. Manufacturers and researchers have put considerable effort toward meeting those regulations. In conventional gasoline powered vehicles that use stoichiometric fuel-air mixtures, three-way catalysts have been shown to control $NO_x$ emissions. In diesel powered vehicles and vehicles with lean-burn gasoline engines, however, the exhaust is too oxygen-rich for three-way catalysts to be effective.

Several solutions have been proposed for controlling $NO_x$ emissions from diesel powered vehicles and lean-burn gasoline engines. One set of approaches focuses on the engine. Techniques such as exhaust gas recirculation and homogenizing fuel-air mixtures can reduce $NO_x$ emissions. These techniques alone, however, will not eliminate $NO_x$ emissions. Another set of approaches remove $NO_x$ from the vehicle exhaust. These include the use of lean-burn $NO_x$ catalysts, $NO_x$ adsorber-catalysts, and selective catalytic reduction (SCR).

Lean-burn $NO_x$ catalysts promote the reduction of $NO_x$ under oxygen-rich conditions. Reduction of $NO_x$ in an oxidizing atmosphere is difficult. It has proved challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean burn $NO_x$ catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak $NO_x$ conversion efficiency with lean-burn catalysts is unacceptably low.

$NO_x$ adsorber-catalysts alternately adsorb $NO_x$ and catalytically reduce it. The adsorber can be taken offline during regeneration and a reducing atmosphere provided. The adsorbant is generally an alkaline earth oxide adsorbant, such as $BaCO_3$ and the catalyst can be a precious metal, such as Ru. A drawback of this system is that the precious metal catalysts and the adsorbant may be poisoned by sulfur.

SCR involves using ammonia as the reductant. The $NO_x$ can be temporarily stored in an adsorbant or ammonia can be fed continuously into the exhaust. SCR can achieve $NO_x$ reductions in excess of 90%. One concern relates to controlling the ammonia feed rate. The $NO_x$ flow rate and demand for ammonia vary widely and rapidly during engine operation. Too little ammonia can lead to $NO_x$ breakthrough and too much ammonia can result in ammonia release, which is an environmental hazard.

U.S. Pat. No. 4,963,332 describes a control scheme for SCR reduction of $NO_x$ in flue gases where the $NO_x$ concentration and mass flow rate are measured upstream of the reactor and $NO_x$ concentration is also measured downstream of the reactor. The mole ratio of ammonia feed to $NO_x$ is adjusted based on the downstream $NO_x$ concentration. U.S. Pat. No. 4,751,054 describes a similar approach using an ammonia sensor.

U.S. Pat. No. 5,522,218 describes a control scheme for NO reduction in diesel exhaust where the reductant is supplied according to a feed forward control scheme based on engine operating conditions and exhaust gas temperature. The reductant supply rate is determined by a table look-up.

U.S. Pat. No. 5,047,220 describes a feed-forward control scheme to establish a supply rate of reductant at 90% of estimated requirements and a feed-back loop to set a trim signal establishing a supply rate for the balance of the required reductant.

U.S. Pat. No. 4,314,345 describes a feed forward control scheme for $NO_x$ reduction in flue gases in which the ammonia supply rate is adjusted during exhaust gas temperature transients to account for temperature-dependent increases and decreases in the amount of ammonia adsorbed in the SCR reactor.

U.S. Pat. No. 5,833,932 describes an SCR reactor for treating diesel exhaust, the reactor having a reductant storage capacity that increases along the reactor's length in the direction of flow. The low capacity up front is said to enhance light-off performance. The large capacity downstream is intended to provide a buffer against sudden increases in demand. It is also said that during transients that involve a sudden temperature increase, reductant desorbed at the front of the reactor can be captured near the back.

U.S. Pat. No. 5,785,937 describes a feed-forward control system for supplying an SCR reactor in a diesel exhaust system. The reducing agent is sometimes fed super-stoichiometrically and sometimes fed sub-stoichiometrically during transients with the objective of maintaining an optimal level of adsorbed ammonia in the SCR reactor.

U.S. Pat. No. 5,643,536 describes a feed-back control system for supplying ammonia to an SCR reactor in a diesel exhaust system wherein the control system is said to measure the thickness of a reaction zone. The thickness of the reaction zone is the depth within a porous wall of the catalyst at which the ammonia concentration passes through a minimum. The feed rate of ammonia is adjusted to seek a targeted reaction zone thickness.

U.S. Pat. No. 5,628,186 describes a feed-forward control system for supplying ammonia to an SCR reactor in a diesel exhaust system wherein the feed rate is adjusted to account for the rate of adsorption or desorption of reductant from the catalyst bed.

After reviewing many of the above-cited references, U.S. Pat. No. 6,662,553 concludes "there are no commercially available $NO_x$ sensors which have the response time needed for vehicular applications" and that "any SCR control system for mobile applications will necessarily be open loop."

U.S. Pat. No. 6,455,009 describes a feedback control system for supplying ammonia to an SCR reactor wherein feedback is provided by a sensor cross-sensitive to ammonia and $NO_x$. The feed rate of ammonia is continuously cycled. When the detection signal is found to be increasing while ammonia feed rate is also increasing, the feed rate is switched to a decreasing trend, optionally following a step decease. When the signal again begins to rise, the feed rate trend is again reversed.

U.S. Pat. No. 6,625,975 describes a system for supplying ammonia to an SCR reactor in a diesel exhaust system wherein a sensor that is cross-sensitive to oxidizable species, but not $NO_x$, is used to measure ammonia concentration for feed-back control. Oxidizable species other than ammonia are removed prior to the SCR reactor by an oxidative catalytic converter.

While a great deal of effort has already been expended in this area, there continues to be a long felt need for reliable, affordable, and effective systems for controlling ammonia supply rates to SCR reactors in diesel exhaust systems.

SUMMARY OF THE INVENTION

The following presents a simplified summary in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later.

One aspect of the invention relates to an exhaust treatment apparatus having an $NO_x$ reduction system comprising first and second catalyst beds in series with associated first and second ammonia injectors. The first catalyst bed with its associated ammonia injector preferably targets removing only about 80 to about 95% percent of the $NO_x$ in the vehicle exhaust. The second catalyst bed and associated injector preferably target removing about 70 to about 100% of the remaining $NO_x$. Staging the reduction system in this manner improves control over $NO_x$ reduction and reduces the risk of ammonia slip. The system can be further subdivided to include more stages.

Another aspect of the invention is related to a method of treating vehicle exhaust to remove $NO_x$. The method involves positioning first and second catalyst beds in series in the exhaust stream. Ammonia is selectively injected upstream of the first catalyst bed and more ammonia is selectively injected between the first and second catalyst beds. A further aspect of the invention relates to an SCR reactor, comprising a housing having an entrance port, an exit port, and an ammonia injection port. The injection port is configured for injecting ammonia into the middle of an SCR catalyst bed contained in the housing.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention in conjunction with the drawings.

DETAILED DESCRIPTION OF THE INVENTION

Figure 1:
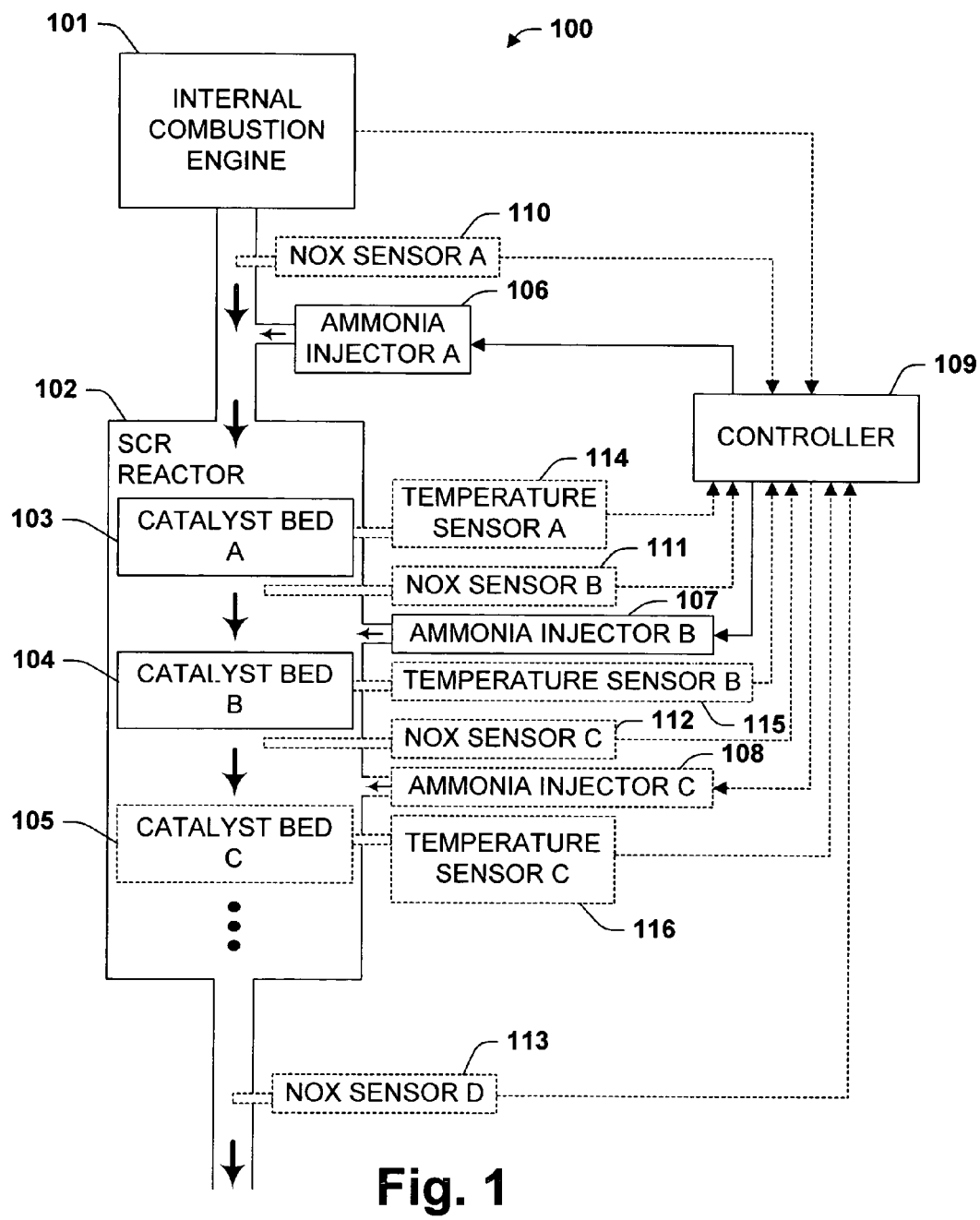
FIG. 1 is a schematic illustration of an exemplary vehicle according to one aspect of the present invention.

FIG. 1 is a schematic illustration of an exemplary vehicle 100 according to one aspect of the present invention. The vehicle 100 comprises an internal combustion engine 101, SCR reactor 102, and a controller 109. The SCR reactor 102 comprises at least two catalysts beds, catalyst bed A 103 and catalyst bed B 104. The vehicle also comprises at least two ammonia injectors, ammonia injector A 106 and ammonia injector B 107. The SCR reactor 102 optionally comprises additional catalyst beds and ammonia injectors, such as a catalyst bed C 105 and an ammonia injector C 108. The ammonia injectors 106–108 are positioned upstream of the SCR reactor 102 and between each adjacent pair of catalyst beds 103–105. The controller 109 controls the ammonia injection rates using data that can include, without limitation, data relating to the operation of internal combustion engine 101, data from one or more NOX sensors 110–113, and/or data from one or more temperature sensors 114–116.

The internal combustion engine 101 is mounted on the vehicle 100 and is powered by a fossil fuel such as diesel, gasoline, natural gas, or propane. The engine 101 burns the fuel and produces an exhaust comprising $NO_x$. $NO_x$ includes, without limitation, NO, $NO_2$, $N_2O$, and $N_2O_2$.

The SCR reactor 103 treats the exhaust to remove $NO_x$. The reaction takes place over the catalyst beds 103–105, which may be referred to as bricks. Each bed contains a catalyst optionally combined with or serving as an adsorbant. The catalyst is for a reaction such as:

$$4NO + 4NH_{3+O2} \rightleftharpoons 4N_2 + 6H_2O$$

Catalysts for this reaction will also reduce other species of $NO_x$. Examples of suitable catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substitutes with metal ions such as cations of Cu, Co, Ag, Zn, or Pt, and activated carbon. A preferred catalyst is a combination of $TiO_2$, with one or more of $WO_3$, $V_2O_5$, and $MoO_3$, for example about 70 to about 95% by weight $TiO_2$, about 5 to about 20% by weight $WO_3$ and/or $MoO_3$, and 0 to about 5% by weight $V_2O_3$. Catalysts of this type are commercially available and can be tailored by the manufacturer for specific applications. The typical temperature range in which these catalysts are effective is from about 230 to about 500° C. Below this temperature range the reaction rate is too slow for effective conversion and above this range ammonia decomposes before reducing $NO_x$.

In addition to a catalyst, the catalyst beds can contain an adsorbant to buffer excess ammonia. If the ammonia feed rate exceeds the $NO_x$ rate, the excess ammonia can be adsorbed, at least until the catalyst/adsorbant bed reaches saturation. Preferably, the adsorbant is concentrated near the rear of each bed where the ammonia concentration is normally low. Adsorption is the preferential partitioning of a substance from the gas phase to the surface of a solid. Adsorption can be chemical or physical.

The adsorbant can be any suitable material. Examples of adsorbants are molecular sieves, alumina, silica, and activated carbon. Further examples are oxides, carbonates, and hydroxides of alkaline earth metals such as Mg, Ca, Sr, and Be or alkali metals such as K or Ce. Still further examples include metal phosphates, such as phosphates of titanium and zirconium.

Molecular seives are materials having a crystalline structure that defines internal cavities and interconnecting pores of regular size. Zeolites are the most common example. Zeolites have crystalline structures generally based on atoms tetrahedrally bonded to each other with oxygen bridges. The atoms are most commonly aluminum and silicon (giving aluminosilicates), but P, Ga, Ge, B, Be, and other atoms can also make up the tetrahedral framework. The properties of a zeolite may be modified by ion exchange, for example with a rare earth metal or chromium. While the selection of an adsorbant depends on such factors as the desired adsorption temperature and the desorption method, preferred zeolites generally include rare earth zeolites and faujisites. Rare earth zeolites are zeolites that have been extensively (i.e., at least about 50%) or fully ion exchanged with a rare earth metal, such as lanthanum.

The catalyst, and adsorbant where present, are typically combined with a binder and either formed into a self-supporting structure or applied as a coating over an inert substrate. A binder can be, for example, a clay, a silicate, or a cement. Portland cement can be used to bind molecular sieve crystals. Generally, catalysts and adsorbants are most effective when a minimum of binder is used.

The catalyst beds 103–105 can have any suitable structure. Suitable structures can include monoliths, layered structures having two-dimensional passages, as between sheets or screens, and packed beds. Monolith passages can have any suitable cross section, including, for example, round, hexagonal, or triangular passages. Sheets or screens can be layered in any suitable fashion including, for example, stacking, rolling, or arraying about a central axis. Packed beds can be formed with pellets of the catalyst, preferably held together with a binder or sintered to form a cohesive mass.

Preferably the catalyst beds 103–105 have a provision for temperature control. One way to control temperature is through the temperature of the exhaust. During normal operation, the exhaust temperature can vary widely. An inert or catalytically active brick with significant thermal mass upstream of the SCR reactor can buffer the temperature, although such a structure can also reduce the start-up time. A heat exchanger can be used to cool the exhaust although generally maintaining sufficient temperature is more of a concern. An oxidative catalytic converter can increase the exhaust temperature by exothermic oxidation of CO and unburned hydrocarbons. Fuel can also be injected directly into the exhaust and oxidized to provide heat.

The catalyst bed temperatures can be controlled directly by fluid heat exchange. For example, the catalyst beds can be permeated with heat-exchange passages in fluid isolation from the passages provided for exhaust flow. A hot or cold fluid can then be circulated through the heat-exchange passages to heat or cool the catalysts beds. A cooling fluid could be, for example, engine coolant or ambient air. A heating fluid could be, for example, a fluid that draws heat from a heat-producing device such as an ammonia synthesis reactor or a catalytic reformer.

The catalyst bed temperatures can be maintained by electrical heating. Where the catalyst beds include metal substrates, the metal substrate can be used as an electrical resistance heater. Metal wires can always be provided for electrical resistance heating.

The need for heating is generally transient, as exhaust temperatures can reach 650° C. In some cases, the need for heating can be avoided or minimized by insulating the SCR reactor 102 and/or the exhaust system upstream of the SCR reactor 102.

The ammonia injectors 106–108 can be of any suitable type and can supply the ammonia in any suitable form, including for example, as gaseous ammonia, liquid ammonia, urea, ammonium bicarbonate, or ammonium carbamate. References to ammonia feed rates are inclusive of supplying any of these substances. The ammonia source for the injector can be a pressure vessel, a liquid tank, or an ammonia plant. An ammonia plant can generate ammonia by reaction between $N_2$ and $H_2$ or between NO and $H_2$. Whether or not an ammonia plant is used, the ammonia can also be stored on an adsorbant bed. Preferably adsorption takes place at a reduced temperature and desorption is driven by heating.

Generally the ammonia source maintains a certain pressure of ammonia and the injectors 106–108 control the flow rates through valves. A valve can control the flow rate by throttling, but preferably the flow rate is controlled by rapidly opening and closing the valve, the flow rate being in proportion to the frequency with which the valve is opened and the duration for which the valve is held open each time. The total demand for ammonia can vary widely with vehicle operation. The ammonia injector A 106 is designed to accommodate the peak ammonia demand, however, the downstream ammonia injectors may have considerably smaller peak demands. This allows the downstream ammonia injectors to be designed for greater precision than the upstream ammonia injectors.

The temperature sensors 114–116 can be of any suitable type. Suitable types may include thermocouples, resistance temperature detectors, and thermistors. The temperature sensor 114–116 can be used to determine whether each of the catalyst beds 103–105 is hot enough to react ammonia with $NO_x$ or so hot that they would simply decompose ammonia. Where a catalyst bed temperature is out of range, injection of ammonia to that bed is generally suspended. The temperature sensors can also be used in estimating adsorption rates, desorption rates, and adsorption capacity for each of the catalyst beds, which information can be used in determining appropriate ammonia injection rates.

The $NO_x$ sensors 110–113 can also be of any suitable type, including for example electrochemical sensors or chemiluminescent sensors. Suitable sensors are manufactured by NGK Insulators, Ltd. While selectivity can be improved with branching diffusion chambers and catalysts, many common $NO_x$ sensors suitable for exhaust system application are cross-sensitive to ammonia. In certain control strategies according to the present invention, ammonia is always undersupplied, whereby it can be assumed that the sensors are always detecting $NO_x$ with little or no interference from ammonia.

When using $NO_x$ sensors cross-sensitive to ammonia between bricks, some care may be needed to avoid ammonia injection affecting $NO_x$ measurements. For example, a signal from the $NO_x$ sensor B 111 could be affected by ammonia from ammonia injector B 107. Where an $NO_x$ sensor B 111 is used and it is cross-sensitive to ammonia, it can be placed upstream of the ammonia injector B 111. If necessary, a flow restriction device can be used to prevent ammonia from convecting or diffusing upstream to the sensor location. A flow restriction device could be, for example, a short section of monolith. The $NO_x$ sensor B 111 can also be embedded part way into the catalyst bed A 103.

The controller 109 sets the ammonia supply rates through the injectors 106–108. The controller 109 can be an engine control unit (ECU) for the vehicle 100 or can be a separate controller. Generally, when the controller 109 is separate from the ECU it communicates with the ECU to obtain data relating to the operation of the internal combustion engine 101.

As part of any control strategy, the controller 109 preferably checks whether each catalyst bed is within an effective operating temperature. One of the advantages of the invention is that during start-up the upstream beds usually reach operating temperature first. These beds can be supplied with ammonia to begin reducing $NO_x$ without waiting for the downstream beds to warm-up.

The controller 109 generally determines an $NO_x$ rate from the engine by some combination of measurement and estimation. In one embodiment, the controller 109 maintains a model relating operating conditions for the internal combustion engine 101 to the $NO_x$ rate. The relevant operating conditions can be, for example, fuel throttle position, engine speed, and engine timing. A model of this nature provides the most rapid response time. The model can be updated over time using actual measurements, such as measurements from the $NO_x$ sensor A 110. In another embodiment, the $NO_x$ rate is taken as the product of the $NO_x$ concentration measured by the $NO_x$ sensor A 110 and the exhaust mass flow rate. The exhaust mass flow rate can be measured, determined from the fuel flow rate, determined from the engine air intake flow rate, or determined exclusively from engine operating conditions.

The ammonia injection rate for the ammonia injector 106 is determined in relation to the $NO_x$ rate. Given the $NO_x$ rate, there is an ammonia rate that would give a stoichiometric amount of ammonia in relation to $NO_x$. In one embodiment, the ammonia injection rate is set at a fraction of the stoichiometric rate. Preferably, the ammonia injection rate is from about 60 to about 95% of the stoichiometric rate, more preferably from about 70 to about 95% of the stoichiometric rate, most preferably from about 80 to about 90% of the stoichiometric rate. In another embodiment, the ammonia injection rate is calculated to reduce the $NO_x$ concentration to a target level. For example, if the peak $NO_x$ concentration typically observed in the exhaust is 1000 PPM, the controller 109 may set the rate for the ammonia injector A to target reducing the NOX concentration across catalyst bed A to about 400 PPM, about 300 PPM, about 200 PPM, about 100 PPM, or about 50 PPM. In a further embodiment, the ammonia injection rate is calculated to reduce the $NO_x$ rate (a molar flow rate) to some fraction of a fixed peak value.

Where the catalyst bed A 103 has significant adsorption capacity, the ammonia feed rate is optionally adjusted to account for ammonia adsorption or desorption. For example, if the temperature sensor A 114 indicates that the catalyst bed A 103 is increasing in temperature, the ammonia injection rate for the ammonia injector A 106 can be reduced by estimated ammonia desorption rate.

Preferably, substantially all of the injected and desorbed ammonia is converted in the catalyst bed A 103, however, even where the ammonia injection rate is sub-stoichiometric, this may not be the case, particularly as the catalyst bed A 103 ages. Ammonia slip can be detected by consistently higher than expected readings from the $NO_x$ sensor B 111, where one is provided. An ammonia sensor can also be provided downstream of the catalyst bed A 103, but upstream of the ammonia injector B 107. Alternatively, the conversion rate can be estimated and used to calculate an ammonia slip rate. The rate of injection from the ammonia injector B 107 can be reduced by the measured or estimated ammonia slip rate.

The controller 109 optionally monitors and reports degrading conversion in the catalyst bed A 103. In one embodiment, the SCR reactor 102 is designed to facilitate separately replacing one or more of the catalyst beds 103–105. In another embodiment, the SCR reactor 102 is designed to allow additional catalyst beds to be added as needed.

Where a catalyst bed C 105 is provided, the ammonia injector B 107 is controlled in a similar manner to the ammonia injector A 106. The $NO_x$ rate at the outlet of the catalyst bed A 103 can be determined from any suitable combination of measurements and estimates. An estimate could be based on the starting $NO_x$ rate and the expected conversion in the catalyst bed A 103. Measurements of the $NO_x$ sensor B 111 can be used instead of estimates, or used to correct a model from which the estimates are obtained.

Where a catalyst bed C 105 is not provided, the ammonia injector B 107 may be controlled differently from the ammonia injector A 106. While ammonia may still be injected conservatively to avoid ammonia slip, optionally near complete conversion of $NO_x$ may be targeted and a full stoichiometric dose of ammonia injected. In addition, the ammonia injector B 107 is optionally controlled with feedback from the NOX sensor D 113 and/or an ammonia sensor in the same position.

Feedback control can involve traditional proportional, integral, and derivative control (PID control), especially PI control. $NO_x$ sensor feedback may be slow in comparison to the rate at which $NO_x$ rate changes, therefore, it may be preferable to use a combination of feedback and feed forward control. Such a combination may involve feedback control that which targets a particular mole ratio between NO and ammonia, the ratio being adjusted based on feedback from the sensor D 113.

The invention has been shown and described with respect to certain aspects, examples, and embodiments. While a particular feature of the invention may have been disclosed with respect to only one of several aspects, examples, or embodiments, the feature may be combined with one or more other features of the other aspects, examples, or embodiments as may be advantageous for any given or particular application.

What is claimed is:

1. An exhaust treatment apparatus, comprising:
   a first ammonia injector configured to inject a first charge of ammonia into an exhaust stream;
   a first catalyst bed positioned to receive the exhaust stream with the first charge of ammonia and adapted to catalyze a reaction between $NO_x$ and ammonia to reduce $NO_x$;
   a second ammonia injector for injecting a second ammonia charge into an effluent from the first catalyst bed;
   a second catalyst bed positioned to receive the effluent from the first catalyst bed with the second charge of ammonia and adapted to catalyze a reaction between NO and ammonia to reduce $NO_x$; and
   an $NO_x$ sensor positioned downstream of the first catalyst bed, and a controller;
   wherein the apparatus is adapted for use in a vehicle exhaust system;
   the controller controls the second ammonia charge based at least in part on data from the $NO_x$ sensor; and
   the second ammonia charge is controlled to be less than a stoichiometric amount a stoichiometric amount being an amount of ammonia just sufficient to reduce all the $NO_x$ remaining after the first catalyst bed to $N_2$.

2. A vehicle comprising the exhaust treatment apparatus of claim 1.

3. The exhaust treatment apparatus of claim 1, wherein the second ammonia charge is the final ammonia charge provided by the apparatus.

4. A vehicle comprising the exhaust treatment apparatus of claim 3.

5. The exhaust treatment apparatus of claim 1, wherein the second ammonia charge is the controlled to be less than about 90% of the stoichiometric amount.

6. A vehicle comprising the exhaust treatment apparatus of claim 5.

7. The exhaust treatment apparatus of claim 1, wherein the $NO_x$ sensor is positioned upstream of the second catalyst bed.

8. A vehicle comprising the exhaust treatment apparatus of claim 7.

9. The exhaust treatment apparatus of claim 1, wherein the $NO_x$ sensor is positioned downstream of the second catalyst bed.

10. A vehicle comprising the exhaust treatment apparatus of claim 9.

* * * * *